March 31, 1925. 1,532,049
P. DOWLING
PANELED STRUCTURE AND METHOD OF FORMING THE SAME
Filed Oct. 11, 1924
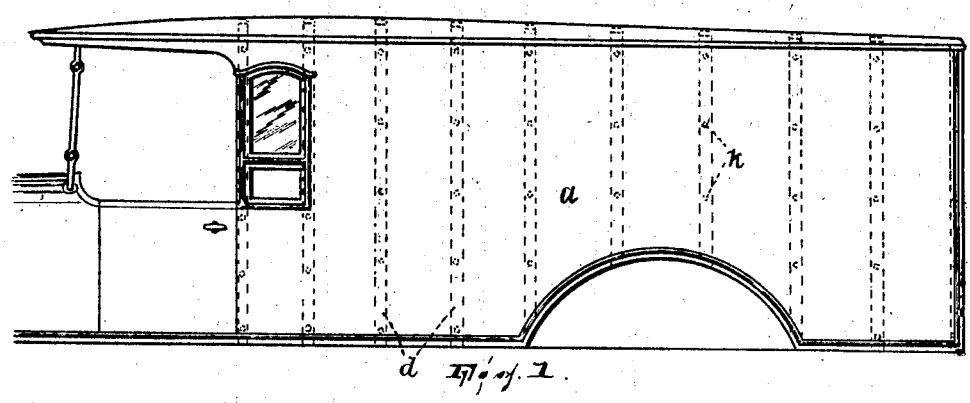
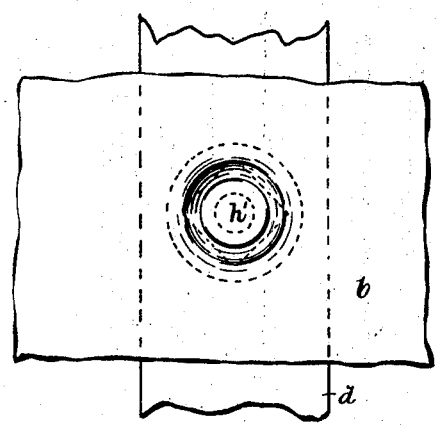
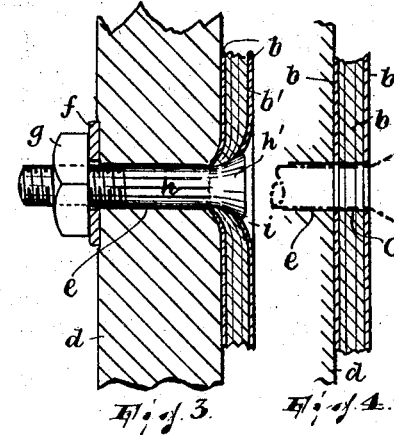
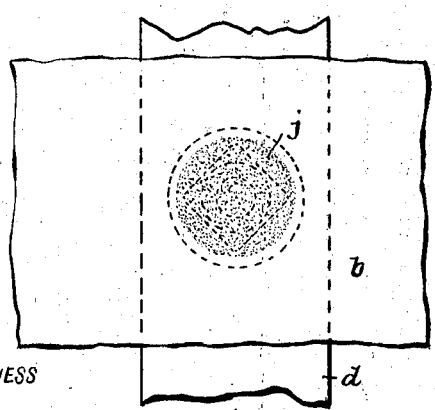
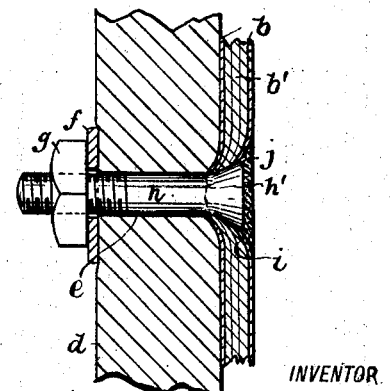
WITNESS
INVENTOR
Peter Dowling
ATTORNEY Patented Mar. 31, 1925.

1,532,049

UNITED STATES PATENT OFFICE.

PETER DOWLING, OF PATERSON, NEW JERSEY.

PANELED STRUCTURE AND METHOD OF FORMING THE SAME.

Application filed October 11, 1924. Serial No. 743,169.

*To all whom it may concern:*

Be it known that I, PETER DOWLING, a citizen of the United States, residing at Paterson, in the county of Passaic and State of New Jersey, have invented certain new and useful Improvements in Paneled Structures and Methods of Forming the Same, of which the following is a specification.

Panels for vehicle bodies are now usually composed of exterior thin layers of sheet metal (as galvanized iron) and an intervening thickness of a lighter substance, as wood veneer or creosoted paper, all cemented together, the idea being to provide a panel presenting a hard smooth surface suitable to receive an attractively painted finish and not be easily damaged by a blow and which will be strong and yet relatively light in weight. Usually these panels are secured in position on the vehicle frame by bolts which are simply driven through the panels and support with their heads projecting from the panels. This is objectionable, as the appearance of the panel is spoiled if it is not perfectly smooth; especially is this true of panels for the finer types of vehicle bodies which are expensively finished and frequently have displayed thereon signs and sometimes pictures which to the eye are marred by the presence of irregularities of any kind in the surface of the panel. Various expedients for fastening these panels in place so that the panel might be treated on its outer face without its fastening means being apparent have been proposed. Boring countersunk holes to receive the bolt heads will not do because the constituent layers of the panels are only cemented together and by this method some of the layers must be left unsecured by the bolts so that the vibration of the vehicle would break down the adhesion and allow the outer layer or layers to work loose. Special fastening expedients have the objection that if effective the cost entailed in their use is excessive, requiring as they usually do special operations on the panel.

The object of this invention is two-fold. That is, to panel a vehicle or other frame in such a way that the paneling will be held with perfect security and so that it will present a perfectly smooth or plane surface.

In the drawings,

Fig. 1 shows a vehicle body panel according to this invention;

Fig. 2 is an outside elevation of a fragment of the paneled wall of the vehicle body shown in Fig. 1 before a certain recess that results in the performance of my invention has been filled up;

Fig. 3 is a sectional view of what is shown in Fig. 2, taken in a plane coincident with the axis of the bolt shown in said figure;

Fig. 4 is a similar section but showing the parts before the said bolt has been drawn into panel-securing position;

Figs. 5 and 6 are views respectively similar to Figs. 2 and 3 but showing the parts after the said recess has been filled up.

The panel may be formed in one piece so as to afford the entire panelled surface $a$ (Fig. 1) or it may be in several sections or separate panels, according to the requirements.

The panel shown in the drawing is of the type in which there are two exterior layers $b$ $b$ of thin metal, as galvanized iron, and between them other layers $b'$ of some compressible material, such as layers of wood veneer. It is not absolutely indispensable that there should be a metal layer at what is to be the inside as well as at the outside of the panel, according to this invention, but there should be in any event a layer at the outside which is composed of metal so as not only to afford a body which will not warp and will keep the panel perfectly planiform under all conditions but which will stand great stress and friction and which will also bend in the carrying out of my invention.

At each point where the panel is to be secured to the frame an aperture or hole is formed in it as indicated at $c$ in Fig. 4.

The frame to which the panel is secured is shown in the drawings as including in the present case uprights $d$ which are usually of wood, as oak. Each upright, at the point where the panel is to be secured thereto, has a hole $e$ drilled therethrough so as to coincide with aperture $c$ of the panel. At the back of the upright and in register with the hole $e$ is a washer $f$ and a nut $g$.

$h$ is a bolt whose shank will be received by the holes $c$ and $e$ and which has one end threaded and the other end enlarged to form a head $h'$, which is preferably conical as shown in Figs. 3 and 6.

With the panel presented as in Fig. 4 with its aperture $c$ registering with hole of the upright, and with the washer and nut placed as shown in Fig. 3, the bolt $h$ as a screw device is screwed through the aperture $c$ into the support formed by $d$ $f$ $g$ until the head of the bolt, by its clamping coaction with said support, compresses the material of the panel around its said aperture to such an extent that a recess $i$ is formed in the outer surface of the panel. I treat the parts $d$ $f$ $g$ as together forming a support, because I do not wish to be limited specifically to the use of a bolt having a nut and washer and in that way being operative to compress the panel as described, since as long as there is present a screw device screwed into a support in any way my invention will be accomplished; a bolt, with a nut and washer, or at least with a nut), is preferred because usually the force necessary to obtain the compression of the panel as described could not be obtained by a mere screw driven directly into the upright $d$ if, as usual, it is formed of wood.

The final step in my method of paneling so that the panel will be securely fastened and present a perfectly smooth outer surface is the filling of the recess of the depression $i$ with a metal substance flush with the outer face of the panel. This I do so that the filling substance will be amalgamated with the metal layer or sheath $b$ of the panel. To this end, having first treated the metal layer in the recess with a flux or an acid, I introduce a filling of solder $j$ into said depression to a level where the surface of the filling will be flush with the general outer face of the panel, as by overfilling the depression with the filling and finally smoothing the filling down to the exact plane of the exposed face of layer $b$.

The result of my invention is that the panel, when fastened to the upright in the way described and at a number of points, as usual and as indicated at $k$ in Fig. 1, will be held if any thing more securely than by the ordinary method first hereinbefore referred to or by any other known method, and the panel at the same time presents a perfectly smooth and permanently intact exterior surface adapted to receive a paint or other finish without any irregularities therein.

I use a conical headed screw device partly to ease the entering action thereof and partly to insure the compressing of the material of the panel without disrupting or otherwise injuring the same, and particularly its thin more or less flexible outer metal layer $b$, such head acting gradually to expand the material as it presses it inward and so bends inward some if not all of the layers—frequently all of the layers will be found to undergo this bending, the wood of the upright being actually indented as shown by Fig. 3.

Having thus fully described my invention what I claim as new and desire to secure by Letters Patent is:

1. The hereindescribed method consisting in placing an apertured compressible laminated panel of the class specified and having a metallic outer layer against the support to which the panel is to be secured, screwing a screw device having a head of greater area than the aperture of the panel through said aperture and into the support until the head compresses the panel around the aperture and becomes sunken below the outer surface of said layer leaving a depression therein, and finally filling said depression with a metal which will amalgamate with the metal of said outer layer of the panel and to a level flush with said surface.

2. A panelled structure including a support, a compressible laminated panel bearing against the support and including a metallic flexible layer remote from the support and a compressible layer body between the metallic layer and support, a headed screw device screwed into the support through the panel and having its head sunken below the outer surface of the panel and holding the material of the panel immediately around said device compressed, and a metal filling occupying said recess and amalgamated with the metallic layer and having its exposed surface flush with the outer surface of the panel.

In testimony whereof I affix my signature.

PETER DOWLING.